United States Patent
Hendricks et al.

(10) Patent No.: US 11,352,767 B2
(45) Date of Patent: Jun. 7, 2022

(54) ENGINE POWER MANAGEMENT STRATEGY

(71) Applicant: Caterpillar Paving Products Inc., Brooklyn Park, MN (US)

(72) Inventors: Kyle David Hendricks, Saint Francis, MN (US); Jeffrey L. Stern, Big Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 61 days.

(21) Appl. No.: 16/853,128

(22) Filed: Apr. 20, 2020

(65) Prior Publication Data
US 2021/0324610 A1    Oct. 21, 2021

(51) Int. Cl.
*E02F 9/22* (2006.01)
*F02D 41/14* (2006.01)

(52) U.S. Cl.
CPC .......... *E02F 9/2246* (2013.01); *E02F 9/2296* (2013.01); *B60Y 2200/41* (2013.01); *F02D 41/1497* (2013.01); *F02D 2250/26* (2013.01); *F15B 2211/6343* (2013.01); *F15B 2211/6651* (2013.01)

(58) Field of Classification Search
CPC ............ E02F 9/2246; F15B 2211/6651; F15B 2211/6343; F02D 29/04; F02D 2200/023
See application file for complete search history.

(56) References Cited

U.S. PATENT DOCUMENTS

| | | | |
|---|---|---|---|
| 4,698,761 A * | 10/1987 | Cooper | G05D 23/24 123/198 D |
| 6,700,212 B2 | 3/2004 | Ackermann et al. | |
| 7,373,239 B2 | 5/2008 | Kamado et al. | |
| 7,587,264 B2 * | 9/2009 | Furuno | B66C 13/16 701/29.6 |
| 7,684,917 B2 * | 3/2010 | Furuno | E02F 9/26 701/50 |

(Continued)

FOREIGN PATENT DOCUMENTS

| CN | 101471096 B | 12/2010 |
|---|---|---|
| CN | 102632890 A | 8/2012 |
| CN | 110203075 A | 9/2019 |

*Primary Examiner* — Thomas E Lazo
(74) *Attorney, Agent, or Firm* — von Briesen & Roper, s.c.; Jeff A. Greene

(57) ABSTRACT

A work machine includes an engine power management system. The work machine includes an engine, a hydraulic temperature sensor, and a coolant temperature sensor. The hydraulic temperature sensor is configured to monitor and transmit a hydraulic fluid temperature, and the coolant temperature sensor is configured to monitor and transmit a coolant fluid temperature. The work machine also includes an engine controller and a machine controller. The engine controller includes a processor, and is operatively associated with the engine and the coolant fluid temperature sensor. The machine controller includes a processor, and is operatively associated with the hydraulic fluid temperature sensor and the engine controller. The machine controller is configured to transmit a torque limit command to the engine controller when the hydraulic fluid temperature or the coolant fluid temperature exceeds a predetermined temperature threshold.

16 Claims, 5 Drawing Sheets

(56) References Cited

U.S. PATENT DOCUMENTS

| | | | |
|---|---|---|---|
| 8,560,185 B2 * | 10/2013 | Narazaki | F02D 29/00 |
| | | | 701/50 |
| 8,997,472 B2 * | 4/2015 | Suzuki | F04B 49/065 |
| | | | 60/328 |
| 9,091,041 B2 * | 7/2015 | Yoshida | F02D 31/008 |
| 9,593,630 B2 * | 3/2017 | Yoshida | E02F 9/2296 |
| 10,267,210 B2 * | 4/2019 | Villegas Muriel | F01P 3/12 |
| 2011/0227744 A1 * | 9/2011 | Shibata | G07C 5/085 |
| | | | 340/679 |
| 2019/0226947 A1 | 7/2019 | Young et al. | |

* cited by examiner

ENGINE POWER MANAGEMENT STRATEGY

TECHNICAL FIELD

The present disclosure generally relates to engine power management and, more specifically, to systems and methods for managing engine power of a work machine.

BACKGROUND

Work machines, including compactors, wheel loaders, hydraulic excavators, forwarders, and tractors typically generate a great deal of engine heat during operation. This engine heat is often exacerbated by a heavily muffled and insulated engine compartment, designed to reduce noise emissions, as well as by operating the work machine in high ambient temperatures. In fact, a high ambient temperature at a worksite can easily limit the engine power available on a work machine. A work machine operating at maximum power in low ambient temperatures is conventionally more productive than a work machine operating at maximum power in high ambient temperatures, because the cooling systems are unable to keep up with the rate of heat generation. Overheating can result in a fault or error, cause the engine to be powered down or the work machine shut off, or even catastrophic work machine failure. Any shutdown of a work machine results in lost time and income.

Prior attempts at controlling temperatures in work machines have been directed to exploiting direct relationships between engine speed and cooling fan speed. For example, U.S. Pat. No. 7,373,239 discloses a system that selects a work mode of a work vehicle according to a magnitude of traveling load and/or workload of the vehicle. Using the selected work mode in combination with a coolant temperature range and detected load on a cooling fan, the system then selects a power curve, and commands an engine to operate in a manner to obtain the selected power curve. The system limits horsepower consumed by the cooling fan, to ensure necessary horsepower is available for the work machine.

There is consequently a need for a system capable of using temperatures of work machine components to manage engine output power in order to anticipate, and thereby prevent, engine failure or damage due to overheating.

SUMMARY

In accordance with one aspect of the present disclosure, a work machine with an engine power management system is disclosed. The work machine may comprise a hydraulic temperature sensor, and a coolant temperature sensor. The hydraulic temperature sensor may monitor and transmit a hydraulic fluid temperature, and the coolant temperature sensor may monitor and transmit a coolant fluid temperature. The work machine may also include an engine controller and a machine controller. The engine controller may include a processor, and may be operatively associated with the engine and the coolant fluid temperature sensor. The machine controller may also include a processor, and may be operatively associated with the hydraulic fluid temperature sensor and the engine controller. The machine controller may be configured to transmit a torque limit command to the engine controller when the hydraulic fluid temperature or the coolant fluid temperature exceeds a predetermined temperature threshold.

In accordance with another aspect of the present disclosure, an engine power management system for use with a work machine is disclosed. The work machine may include an engine. The engine power management system may include a hydraulic temperature sensor and a coolant temperature sensor. The hydraulic temperature sensor may monitor and transmit a hydraulic fluid temperature, and the coolant temperature sensor may monitor and transmit a coolant fluid temperature. The engine power management system may also include an engine controller and a machine controller. The engine controller may include a processor and may be operatively associated with the engine and the coolant fluid temperature sensor. The engine controller may be configured to receive the coolant fluid temperature transmitted by the coolant temperature sensor. The machine controller may also include a processor and may be operatively associated with the hydraulic fluid temperature sensor and the engine controller. The machine controller may be configured to receive the hydraulic fluid temperature from the hydraulic temperature sensor, retrieve the coolant fluid temperature from the engine controller, and transmit a torque limit command to the engine controller if the hydraulic fluid temperature or the coolant fluid temperature exceeds a predetermine temperature threshold.

In accordance with yet another aspect of the present disclosure, a method of managing engine power of a work machine is disclosed. The work machine may include an engine. The method may include monitoring a temperature of a hydraulic fluid of the work machine, and monitoring a temperature of a coolant fluid of the work machine. The method may also include limiting a torque of the engine when either the temperature of the hydraulic fluid or the temperature of the coolant fluid exceeds a first predetermined threshold. Finally, the method may include removing the limit to the torque of the engine when the hydraulic fluid temperature and the coolant fluid temperature fall below a second predetermined threshold for a predetermined period of time.

These and other aspects and features of the present disclosure will be better understood upon reading the following detailed description, when taken in conjunction with the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
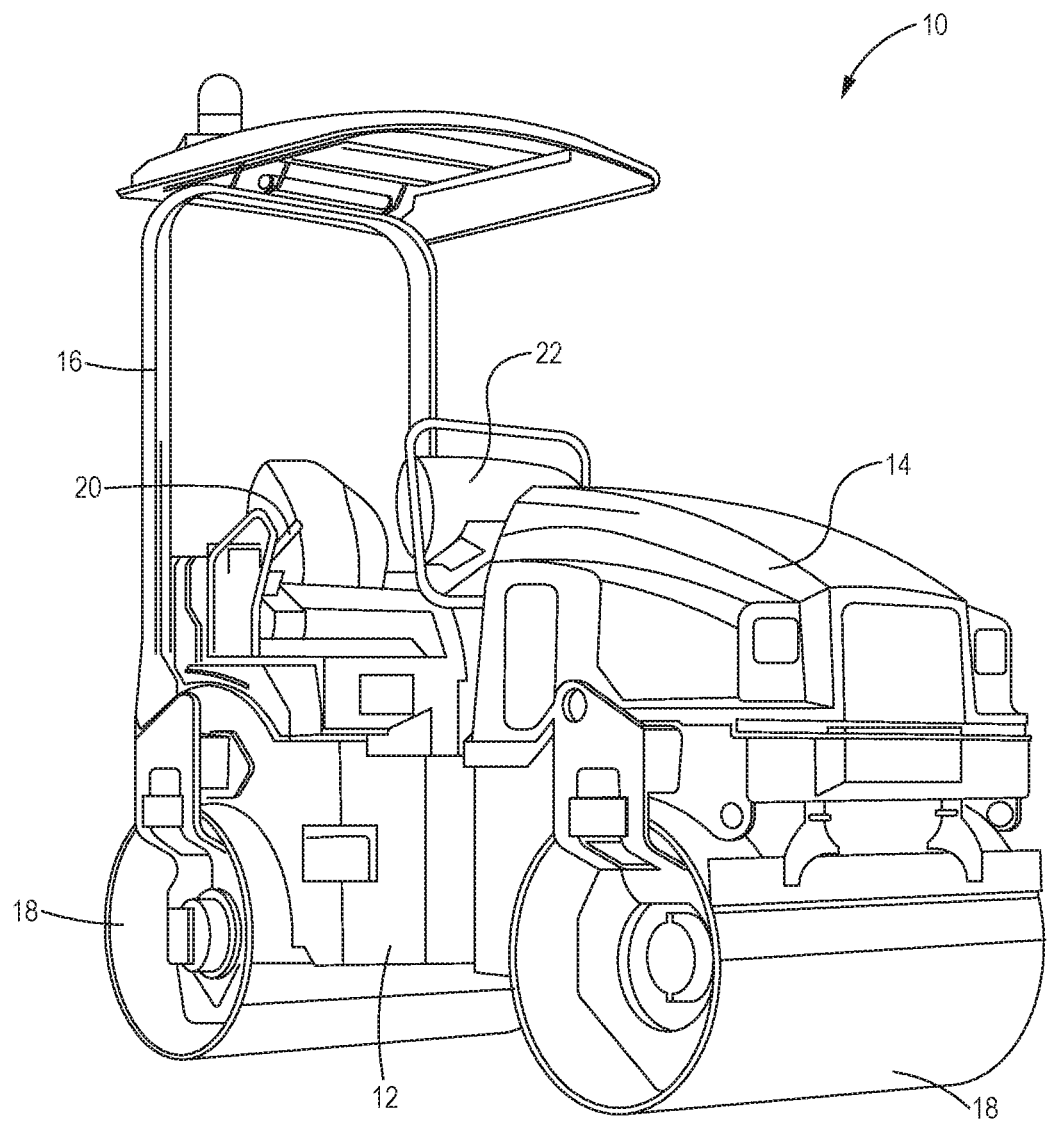
FIG. 1 is a side perspective view of a work machine, in accordance with an embodiment of the present disclosure.

FIG. 1 illustrates a side perspective view of a work machine 10, according to an embodiment of the present disclosure. The exemplary work machine 10 may be a vehicle such as a compactor, although the features disclosed herein may be utilized with other types of machines, regardless of the type of work performed by the machine. The term "machine" includes vehicles or machines. The illustrated work machine 10 generally includes a frame 12, an engine housing 14, an operator cab 16, and a plurality of compactor rollers 18. The engine housing 14 may house an engine 26 (FIG. 2), as well as its systems and components thereof, as disclosed herein. The compactor rollers 18 illustrated in FIG. 1 are rotatably coupled to the frame 12, and may be used for compacting a work material (not shown), such as soil, gravel, asphalt, or other material as the work machine 10 travels thereon. It should be appreciated that the work machine 10 may include a single compactor roller 18 and rubber tires (not shown). Furthermore, while the work machine 10 is illustrated as a compactor with compactor rollers 18, the presently disclosed features are compatible with other machines, including, but not limited to, wheel-equipped and track-equipped work machines.

In the illustrated embodiment, the work machine 10 is an operator operated machine, and thus includes the operator cab 16. However, in various other embodiments, the work machine 10 may be an autonomous machine, a semiautonomous machine, a remotely operated machine, or a remotely supervised machine, among others. The operator cab 16 may be mounted to the frame 12, and may include one or more control devices 20 that a user or operator may use to maneuver and control the work machine 10. These control devices 20 may include one or more joysticks, pedals, levers, buttons, steering wheels, or any other suitable control device or interface (or any of various combinations thereof) configured to be actuated or otherwise engaged to effectuate control of the work machine 10. The operator cab 16 may also include a display unit 22 for displaying visual data pertaining to the components and/or the current operations of the work machine 10 to the operator stationed within the operator cab. The display unit 22 may be included as a control device 20 when it is configured, for example, as a tablet computing device (or other device consistent therewith), such that, through the display unit, the operator may interact with, control, and/or operate the various systems of the work machine 10.

Figure 2:
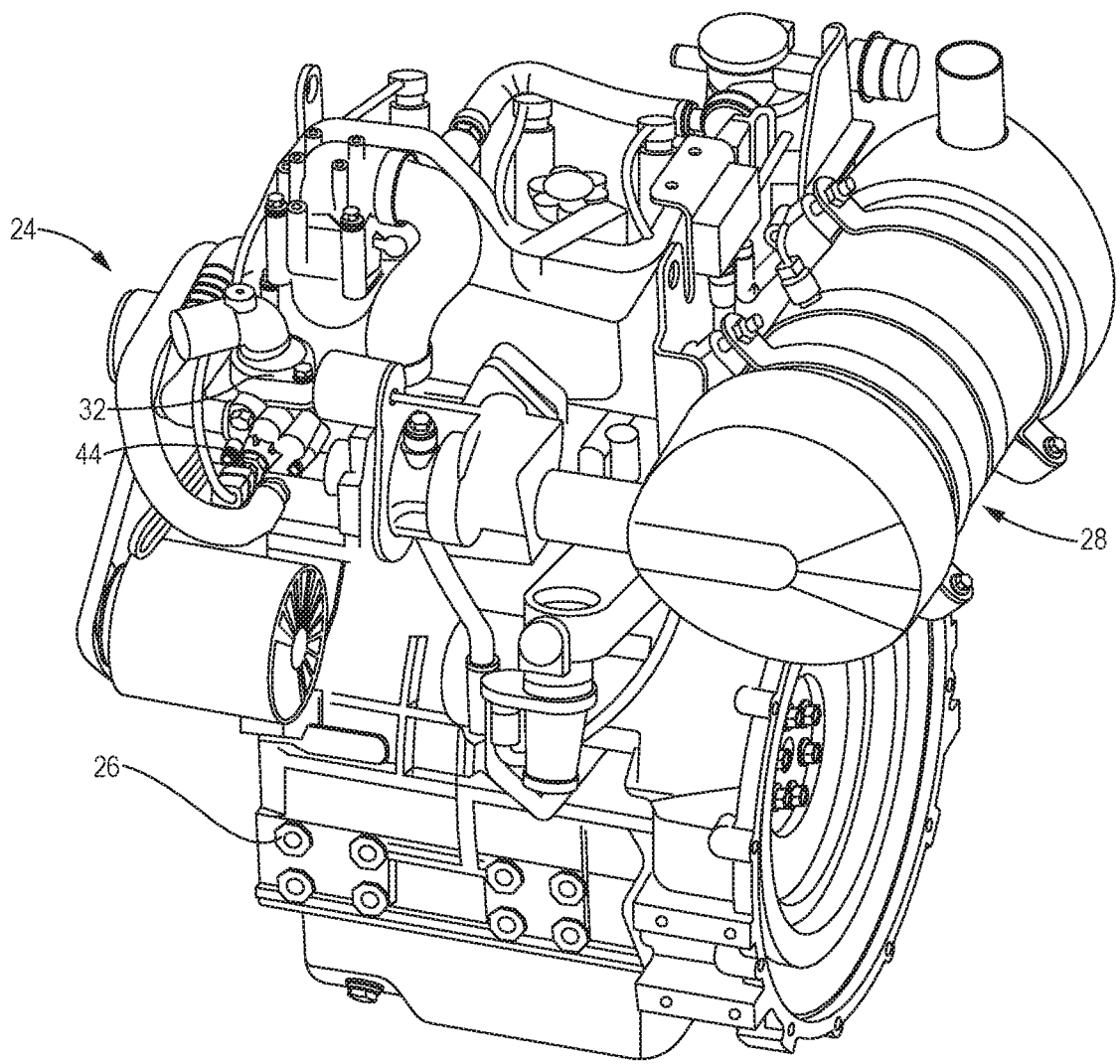
FIG. 2 is an elevated perspective view of a portion of an engine assembly, in accordance with an embodiment of the present disclosure.

Referring now to FIG. 2, with continued reference to FIG. 1, a portion of an engine system 24 is shown including an engine 26. The engine 26 may be a diesel engine, a gasoline engine, a gaseous fuel-powered engine or any other type of engine apparent to one skilled in the art. The engine 26 may be housed in the engine housing 14 along with batteries, pumps, air compressors, hydraulic fluid storage (FIG. 3), a cooling system and other equipment necessary to power and operate the work machine 10 that is not specifically numbered. Portions of an exhaust system 28 are illustrated in FIG. 2, and are included as part of the engine system 24.

The cooling system (not shown) of the engine 26 helps to maintain stable engine temperatures under varying operating conditions. Namely, the cooling system may enable circulation of coolant through pipes, hoses, heat exchangers, and/or coolant reservoirs, among other components. The coolant may be a liquid, and may include, for example, water, ethylene glycol, and other suitable solutions. The cooling system may also include a thermostat valve 32, which enables the engine 26 to maintain a proper temperature by regulating the flow of coolant from the engine to a radiator (not shown). For example, in cold weather, it may be advantageous to warm the engine upon startup. In this case, while the engine 26 is cold, the thermostat valve 32 may be closed to prevent coolant from flowing to the radiator, which can result in a rapid increase in engine temperature. Conversely, when the thermostat valve 32 is open, heated coolant from the engine 26 flows freely to the radiator, where heat is dissipated, thereby cooling the engine.

The cooling system may further include a coolant temperature sensor 44. While a single coolant temperature sensor 44 is illustrated in FIG. 2, multiple coolant temperature sensors may also be utilized. In the illustrated embodiment, the coolant temperature sensor 44 is positioned within the thermostat valve 32 housing. Preferably, the coolant temperature sensor 44 may directly contact the flow of coolant. However, it will be appreciated that, in an alternate embodiment, the temperature of the coolant may be measured without direct contact between coolant temperature sensor 44 and the coolant fluid. The coolant temperature sensor 44 may include any type of device(s) or any type of component(s) that may sense (or detect) a temperature of the coolant.

Figure 3:
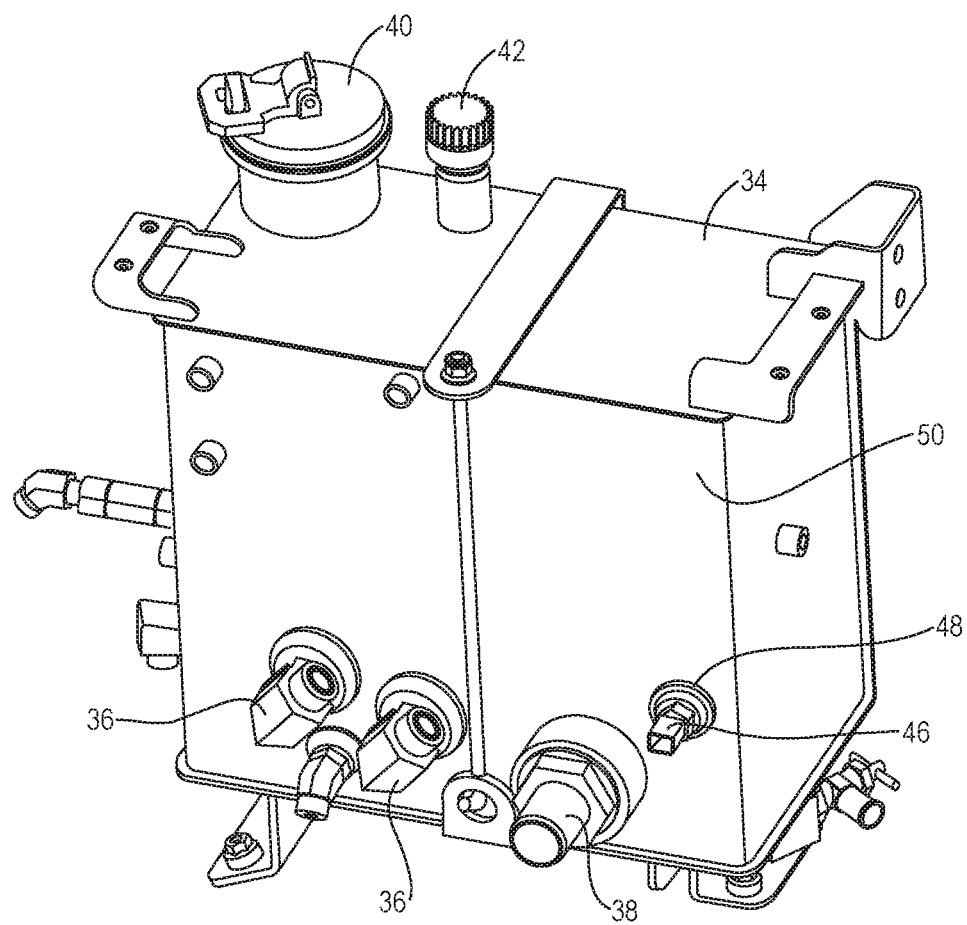
FIG. 3 is an elevated perspective view of a hydraulic oil tank, in accordance with an embodiment of the present disclosure.
Figure 4:
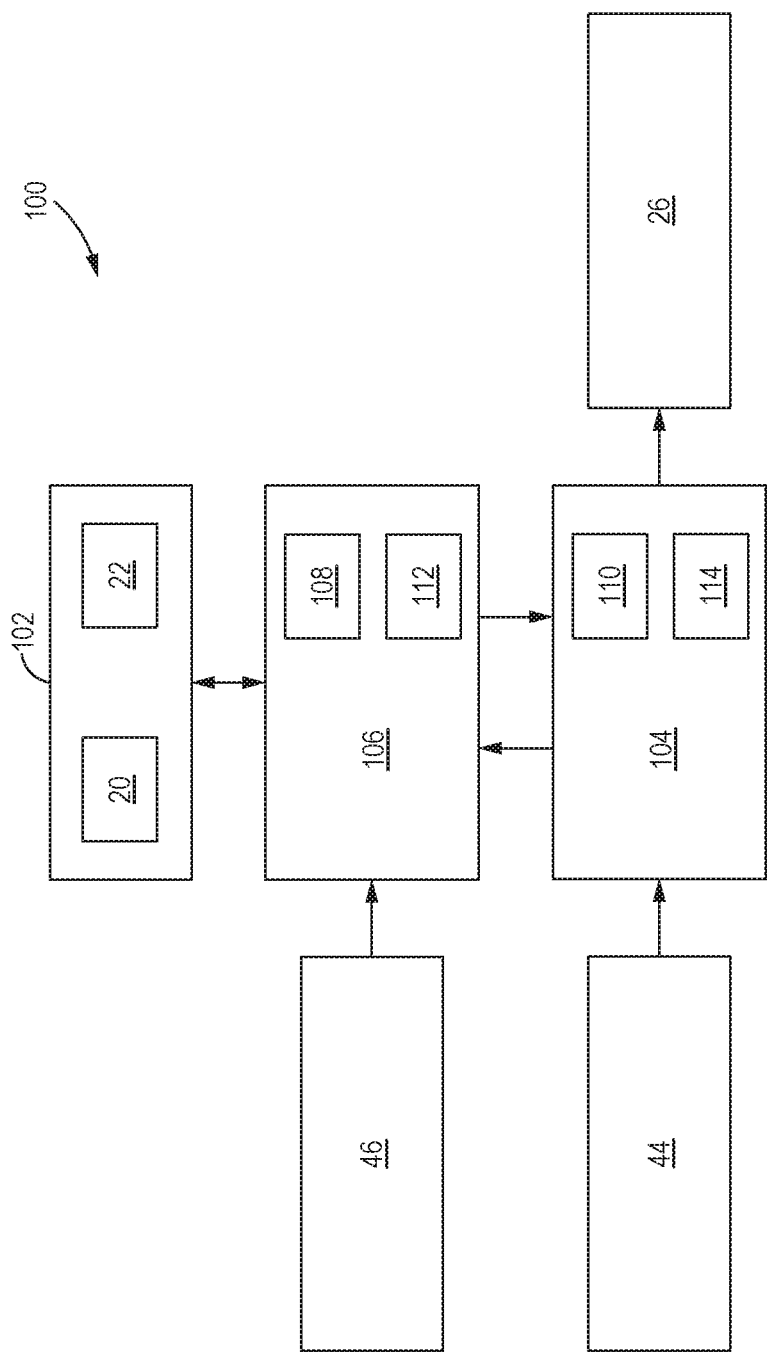
FIG. 4 is a schematic illustration of an engine power management system, in accordance with an embodiment of the present disclosure.

With reference to FIG. 3, the engine 26 may also be used to drive a hydraulic pump (not shown) which may be part of a hydraulic system of the work machine 10. The hydraulic system may be used to drive multiple components of the work machine 10. In the presently illustrated work machine 10, for example, the hydraulic system may be used to drive a vibratory mechanism (not shown) in each compacting rollers 18. The vibratory mechanism may enable the compacting roller 18 to impart a vibrational, oscillating or other repeating force onto the material being compacted. The hydraulic system of the present work machine 10 may utilize a hydraulic fluid tank or reservoir 34 for holding hydraulic fluid that may be pumped to motors, cylinders, or other hydraulic devices. The tank 34 generally includes a plurality of hydraulic fluid inlets 36, a hydraulic fluid outlet 38, a filler tube and cap assembly 40, and a breather 42 that allows for air flow into and out of the tank due to pressure changes therein.

The hydraulic fluid tank 34 may further include a hydraulic fluid temperature sensor 46, which may be configured to monitor a temperature of the hydraulic fluid in the hydraulic fluid tank. While a single coolant temperature sensor 44 is illustrated in FIG. 2, multiple temperature sensors may also be utilized, and may be located anywhere within the hydraulic system. To enable installation of the hydraulic fluid temperature sensor 46, an access port 48 may be formed in a wall 50 of the tank 34. The hydraulic fluid temperature sensor 46 may be inserted through the port 48 such that at least a portion of the hydraulic fluid temperature sensor extends into an interior portion (not shown) of the tank 34 and contacts the hydraulic fluid present therein. Preferably, the hydraulic fluid temperature sensor 46 is at least partially submerged in the hydraulic fluid. However, it will be appreciated that, in an alternate embodiment, the temperature of the hydraulic fluid may be measured without direct contact between hydraulic fluid temperature sensor 46 and the hydraulic fluid. The hydraulic fluid temperature sensor 46 may include any type of device(s) or any type of component(s) that may sense (or detect) a temperature of the hydraulic fluid.

Monitoring the temperatures of various components of the work machine 10, including the coolant temperature and hydraulic fluid temperature, is essential in preventing overheating and maintaining optimal performance of the engine 26 and related components. As discussed above, running the engine 26 at maximum operating speeds may be desirable in some working conditions. However, when not properly monitored, the engine 26 may generate extreme heat causing direct failure of the engine or components in proximity to the engine. For example, circulating coolant at an improper temperature can easily result in a failure of the coolant to properly cool the sliding and rolling components of engine 26, which can result in catastrophic failure of the engine. To prevent such failure, the work machine 10 includes an engine power management system 100, which monitors at least coolant temperature and hydraulic fluid temperature to determine whether to limit a maximum operating torque and power output of the engine 26 before overheating can occur.

Figure 5:
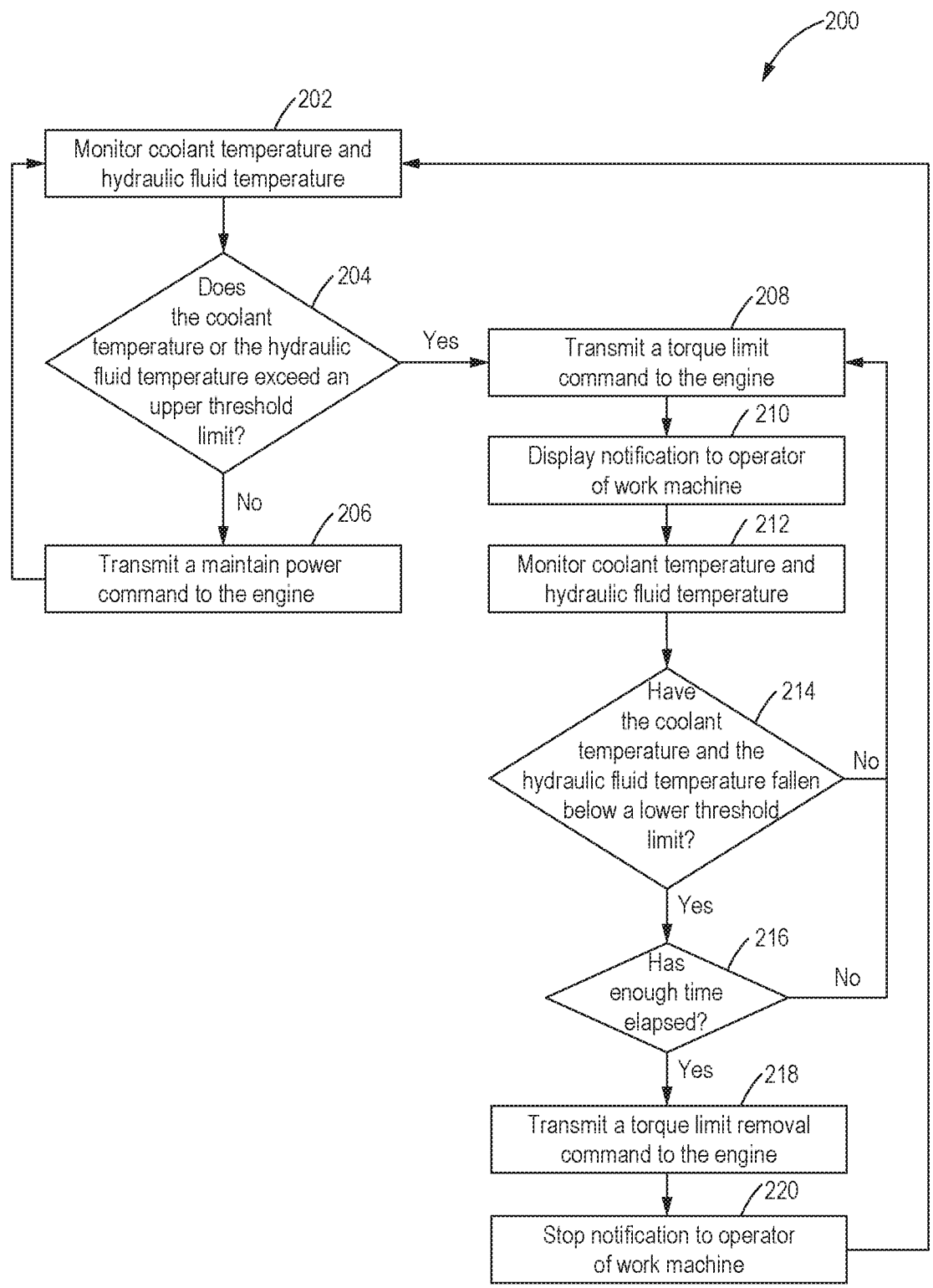
FIG. 5 is a flowchart illustrating a method of managing engine power of a work machine, in accordance with an embodiment of the present disclosure.

As illustrated in FIG. 5, with continued reference to FIGS. 1-4, the engine power management system 100 includes the hydraulic fluid temperature sensor 46, the coolant temperature sensor 44, an operator system 102, an engine electronic control module (hereinafter, the "engine ECM") 104, a machine electronic control module (hereinafter, the "machine ECM") 106, and the engine 26. The hydraulic fluid temperature sensor 46 is in electronic communication with the machine ECM 106, and transmits data signals, readings, and/or sensed measurements electronically for processing. Similarly, the coolant temperature sensor 44 is in electronic communication with the engine ECM 104, and also transmits data signals, readings, and/or sensed measurements electronically for processing. The operator system 102 may be configured to receive input from an operator of the work machine 10 via the one or more control devices 20, and to transmit that input to the machine ECM 106. The engine ECM 104 may be operatively associated with the engine 26, and in electronic communication with the coolant temperature sensor 44 and the machine ECM 106. The machine ECM, however, may be operatively associated with the work machine 10, and in electronic communication with the hydraulic fluid temperature sensor 46, the operator system 102, and the engine ECM.

Both the engine ECM 104 and the machine ECM 106 may include any type of device or any type of component that may interpret and/or execute information and/or instructions stored within a memory 108, 110 to perform one or more functions. The memory 108, 110 may include a random access memory ("RAM"), a read only memory ("ROM"), and/or another type of dynamic or static storage device (e.g., a flash, magnetic, or optical memory) that stores information and/or instructions for use by the example components, including the information and/or instructions used by the engine ECM 104 and the machine ECM 106. Additionally, or alternatively, the memory may include non-transitory computer-readable medium or memory, such as a disc drive, flash drive, optical memory, read-only memory (ROM), or the like. The memory 108, 110 may store the information and/or the instructions in one or more data structures, such as one or more databases, tables, lists, trees, etc. Both the engine ECM 104 and the machine ECM may also include a processor 112, 114 (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.), and/or any other hardware and/or software. The engine ECM and the machine ECM 106 may transmit data via a network (not shown). For example, the machine ECM 106 may be configured to provide output to the operator system 102 for display on one or more display units 22 that may be visible by the operator of the work machine 10, but may also be configured to provide output to external system, including those that may be electronically coupled to a plurality of controllers associated with a plurality of work machines and other vehicles. In this regard, data associated with each work machine may be stored in a central location and may be accessible by machine operators, technicians, data analysts, and others, as needed.

As discussed above and further discussed herein, the engine power management system 100, and the included and/or associated components thereof, is configured to continuously monitor, process, and determine, in part, the performance, operating condition, and/or whether to limit a maximum operating torque and power output of the engine 26, in real time. The engine power management system 100 is therefore configured to provide notification, in real time, to the operator and/or external systems, as disclosed herein, when the maximum operating torque and power output of the engine 26 has been limited, as determined by the engine ECM 104 and the machine ECM 106. In providing such notification, and taking such precautionary measures, the engine power management system 100 can provide the operator and/or technicians with vital information and enable them to take any further appropriate responsive actions, before damage or failure of the work machine 10 can occur, thereby preventing any machine downtime or loss in productivity.

INDUSTRIAL APPLICABILITY

In operation, the present disclosure finds utility in various industrial applications, including, but not limited to, construction, paving, transportation, mining, industrial, earth-moving, agricultural, and forestry machines and equipment. For example, the present disclosure may be applied to compacting machines, paving machines, dump trucks, mining vehicles, on-highway vehicles, off-highway vehicles, earth-moving vehicles, agricultural equipment, material handling equipment, and/or any machine including an electronically controlled combustion engine. More particularly, the present disclosure relates to managing engine power to protect the engine from overheating.

A series of steps 200 involved in managing the power output by the engine 26 of the work machine 10 is illustrated in a flowchart format in FIG. 5. Continued reference will also be made to elements illustrated in FIGS. 1-4. The series of steps 200 may be performed by the engine ECM 104, the machine ECM 106, or a combination thereof as part of the engine power management system 100. As shown in FIG. 5, in a first step 202, the coolant temperature and hydraulic fluid temperatures may be monitored by the engine power management system 100. More specifically, the sensed and transmitted coolant temperature may be received by the engine ECM 104. The sensed and transmitted hydraulic fluid temperature may be received by the machine ECM 106. Monitoring and transmitting the temperatures of the hydraulic fluid and coolant may be accomplished through any means known in the art, including, for example, through the use of one or more temperature sensors, including the coolant temperature sensor 44 and the hydraulic fluid temperature sensor 46. While the present disclosure utilizes coolant and hydraulic fluid temperatures, it should be noted and appreciated that additional data, such as air temperatures, lubricant temperatures, transmission oil temperatures, fuel temperatures and other data, may be monitored and analyzed in the same manner described herein.

The machine ECM 106, at step 204, may then analyze the coolant temperature and the hydraulic fluid temperature to compare each temperature to predetermined upper temperature threshold values. As the machine ECM 106 received the transmitted hydraulic fluid temperature directly from the hydraulic fluid temperature sensor 46 (step 202), the machine ECM may compare the hydraulic fluid temperature to a predetermined upper hydraulic fluid temperature threshold that may be stored in the memory 108 associated with the machine ECM. Generally, if the hydraulic fluid temperature exceeds approximately 83° C., the work machine 10 may be operating with increased risk of overheating. However, the predetermined upper hydraulic fluid temperature threshold may vary according to site parameters, the type of hydraulic fluid used, operating conditions, and other variables. In other embodiments, for example, the predetermined upper hydraulic fluid temperature threshold may be as low as 73° C., or as high as 93° C.

The machine ECM 106, at step 204, also analyzes the coolant temperature received by the engine ECM 104. To do so, the machine ECM 106 must first retrieve the coolant temperature from the engine ECM 104. Once the machine ECM 106 has obtained the coolant temperature, the analysis performed is similar to that described above for the hydraulic fluid temperature. Namely, the machine ECM may compare the coolant temperature to a predetermined upper coolant temperature threshold that may be stored in the memory 108 associated with the machine ECM. Generally, if the coolant temperature exceeds approximately 110° C., the work machine 10 may be operating with increased risk of overheating. However, the predetermined upper coolant temperature threshold may vary according to site parameters, the type of coolant used, operating conditions, and other variables. In other embodiments, for example, the predetermined upper hydraulic fluid temperature threshold may be as low as 100° C., or as high as 120° C.

If the analysis performed above indicates that neither the hydraulic fluid temperature nor the coolant temperature exceeds its respective predetermined upper temperature threshold, then the machine ECM 106 may transmit a message to the engine ECM 104 indicating that the engine 26 may maintain operation at its current torque and power output settings (step 206). Those skilled in the art will recognize that the message may be in the form of a standard Torque/Speed Control #1 ("TSC1") engine control message, although other methods and forms may be used. The engine ECM 104 implements the message at the engine 26. While the hydraulic fluid temperature and coolant temperature remain below their respective predetermined upper temperature thresholds, the work machine 10 is determined to be operating without risk of overheating, and the machine ECM 106 and engine ECM 104 will continue to monitor and analyze the hydraulic fluid and coolant temperatures (step 202). It should be that while a step-by-step method is described herein, the various processes described herein may be performed simultaneously, continuously, and in real-time. In a preferred embodiment, for example, the engine ECM 104 receives and implements TSC1 messages every 15 ms or less.

If, during analysis, the machine ECM determines that either the hydraulic fluid temperature exceeds the upper hydraulic fluid temperature threshold or the coolant temperature exceeds the upper coolant temperature threshold, then the machine ECM 106 may transmit a torque limit command to the engine ECM 104. By torque limiting the engine 26, the engine speed and output power may be reduced, allowing engine components and components of related systems (e.g. hydraulic systems and cooling systems) to cool down. To implement the torque limit on the engine 26, the machine ECM 106 may first calculate a torque limit using a predetermined desired power output and the current engine speed, and transmit that calculated torque limit to the engine ECM 104 (step 208). As mentioned previously, those skilled in the art will recognize that the transmission may be via a standard TSC1 message, in which case the calculated torque limit may be added to an appropriate field of the TSC1 message before transmission, although other methods and forms of data transfer may be used. Once received, the engine ECM 104 executes the torque limit command on the engine 26.

At step 210, the machine ECM 106 commands the operator display 22 to communicate a visual and/or audial indication to the operator of the work machine 10 that the engine 26 has been torque limited. An audial indicator or warning may include an alarm, buzzing, and similar sounds optimized to gain the attention of the operator of the work machine 10. Visual warnings may include simply illuminating a light on the operator display 22, or may include displaying symbols, graphics or text that not only informs the operator of the warning, but also instructs the operator to take specific actions.

At step 212, the machine ECM 106 and engine ECM 104 continue receiving the hydraulic fluid temperature and coolant temperature from the hydraulic fluid temperature sensor 46 and the coolant temperature sensor 44. However, while the engine 26 is torque limited, the machine ECM's 106 analysis (steps 214 and 216) focuses on determining whether the temperatures have fallen enough, for a long enough period of time, to allow removal of the torque limitation.

At step 214, the machine ECM 106 analyzes the coolant temperature and the hydraulic fluid temperature to compare each temperature to predetermined lower temperature threshold values. Namely, the machine ECM 106 may compare the hydraulic fluid temperature to a predetermined lower hydraulic fluid temperature threshold that may be stored in the memory 108 associated with the machine ECM. Generally, if the hydraulic fluid temperature falls below approximately 79° C., the work machine 10 may no longer be at risk of overheating. However, the predetermined lower hydraulic fluid temperature threshold may vary according to site parameters, the type of hydraulic fluid used, operating conditions, and other variables. In other embodiments, for example, the predetermined lower hydraulic fluid temperature threshold may be as low as 69° C., or as high as 89° C. The machine ECM 106 also retrieves the coolant temperature from the engine ECM 104, and compares the retrieved coolant temperature to a predetermined lower coolant temperature threshold that may also be stored in the memory 108 associated with the machine ECM. Generally, if the coolant temperature falls below approximately 106° C., the work machine 10 may no longer be at risk of overheating. However, the predetermined lower coolant temperature threshold may vary according to site parameters, the type of coolant used, operating conditions, and other variables. In other embodiments, for example, the predetermined lower hydraulic fluid temperature threshold may be as low as 96° C., or as high as 116° C.

If, during analysis at step 214, the machine ECM 106 determines that either the hydraulic fluid temperature or the coolant temperature failed to fall below its respective lower temperature threshold, steps 208, 210, 212 and 214 will repeatedly execute until the machine ECM determines that both the hydraulic fluid temperature and the coolant temperature have fallen below their respective lower temperature thresholds. Once that occurs, the machine ECM 106 may then further verify that the hydraulic fluid temperature and the coolant temperature have remained below their respective lower temperature thresholds for a predetermined amount of time (step 216). For example, the hydraulic fluid temperature and the coolant temperature may be required to remain below their respective lower temperature thresholds for approximately 10 seconds; however, the predetermined amount of time may vary according to engine parameters, operating conditions, and other variables. Without this step 216, the hydraulic fluid temperature and/or coolant temperature could continually shift above and below their respective lower temperature thresholds, causing the torque limit to engage and disengage just as rapidly, which may result in damage to the electronic control systems or even the engine 26 itself.

Similar to step 214, if at step 216, the machine ECM 106 determines that not enough time has elapsed with both the hydraulic fluid temperature and the coolant temperature remaining below their respective lower temperature thresholds, steps 208, 210, 212, 214 and 216 will repeatedly execute until the machine ECM determines that both the hydraulic fluid temperature and the coolant temperature have remained below their respective lower temperature thresholds for the predetermined amount of time.

Once the machine ECM determines that both the hydraulic fluid temperature and the coolant temperature have remained below their respective lower temperature thresholds for the predetermined amount of time, the machine ECM 106 may transmit a torque release command to the engine ECM 104 to remove the torque limit on the engine 26 (step 218). By removing the torque limit on the engine 26, the engine torque and output power may be increased, even allowing the engine to operate at full power. To remove the torque limit on the engine 26, the machine ECM 106 may transmit the torque release command to the engine ECM 104. As mentioned previously, those skilled in the art will recognize that the transmission may be via a standard TSC1 message, although other methods and forms of data transfer may be used. Once received, the engine ECM 104 may remove the torque limit on the engine 26.

With the engine 26 operating without a torque limit, the machine ECM 106 may instruct the operator display 22 to stop communicating the torque limit notification to the operator of the work machine 10 (step 220). Finally, the machine ECM 106 and engine ECM 104 may return to monitoring and analyzing the coolant temperature and hydraulic fluid temperature described above with respect to step 202.

While a series of steps and operations have been described herein, those skilled in the art will recognize that these steps and operations may be re-arranged, replaced, eliminated, or performed simultaneously without departing from the spirit and scope of the present disclosure as set forth in the claims.

With implementation of the present disclosure, operators of work machines may be alerted of a possible overheating or failure of the engine or other system before a catastrophic failure occurs, not in response to it. With early warning and an automated system designed to protect the engine and other components of the work machine, operators of a given work machine may be able to use that warning to plan maintenance, overhaul, and/or other service routines on the engine or work machine in a timely manner with little or no obstruction to an ongoing job on a worksite. Moreover, upon detection of an overheating risk, the presently described power management system is configured to take corrective actions to prevent failure.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A work machine with an engine power management system, the work machine comprising:
   an engine;
   a hydraulic temperature sensor configured to monitor and transmit a hydraulic fluid temperature;
   a coolant temperature sensor configured to monitor and transmit a coolant fluid temperature;
   an engine controller, including a processor, operatively associated with the engine and the coolant fluid temperature sensor; and
   a machine controller, including a processor, operatively associated with the hydraulic fluid temperature sensor and the engine controller, the machine controller configured to transmit a torque limit command to the engine controller, to implement a torque limit on the engine when the hydraulic fluid temperature or the coolant fluid temperature exceeds a predetermined temperature threshold, and transmit a torque release command to the engine controller when the hydraulic fluid temperature and the coolant fluid temperature fall below a second predetermined temperature threshold for a predetermined period of time.

2. The work machine of claim 1, wherein when the engine controller receives the transmitted torque release command, the engine controller removes the torque limit on the engine.

3. The work machine of claim 1, wherein the hydraulic temperature sensor is fixed to a hydraulic fluid tank containing hydraulic fluid, the hydraulic temperature sensor being at least partially submerged in the hydraulic fluid.

4. The work machine of claim 1, wherein the coolant temperature sensor is fixed to a coolant line carrying coolant fluid to the engine, the coolant temperature sensor being at least partially submerged in the coolant fluid.

5. The work machine of claim 1, wherein the machine controller is further configured to display a warning to an operator of the work machine when the hydraulic fluid temperature or the coolant fluid temperature exceeds the predetermined temperature threshold.

6. An engine power management system for a work machine including an engine, the engine power management system comprising:
   a hydraulic temperature sensor configured to monitor and transmit a hydraulic fluid temperature;
   a coolant temperature sensor configured to monitor and transmit a coolant fluid temperature;
   an engine controller, including a processor, operatively associated with the engine and the coolant fluid temperature sensor, the engine controller configured to receive the coolant fluid temperature transmitted by the coolant temperature sensor; and
   a machine controller, including a processor, operatively associated with the hydraulic fluid temperature sensor and the engine controller, the machine controller configured to:
      receive the hydraulic fluid temperature from the hydraulic temperature sensor,
      retrieve the coolant fluid temperature from the engine controller, and transmit a torque limit command to the engine controller, to implement a torque limit on the engine if the hydraulic fluid temperature or the coolant fluid temperature exceeds a predetermined temperature threshold, and transmit a torque release command when the hydraulic fluid temperature and the coolant fluid temperature fall below a second predetermined temperature threshold for a predetermined period of time.

7. The engine power management system of claim 6, wherein the engine controller is further configured to receive the transmitted torque release command, and remove the torque limit on the engine.

8. The engine power management system of claim 6, wherein the machine controller is further configured to transmit a maintain power command to the engine controller if neither the hydraulic fluid temperature nor the coolant fluid temperature exceeds the predetermined temperature threshold.

9. The engine power management system of claim 8, wherein the engine controller is further configured to receive the transmitted maintain power command, and maintain a current engine torque.

10. The engine power management system of claim 6, wherein the machine controller is further configured to display a warning to an operator of the work machine when the hydraulic fluid temperature or the coolant fluid temperature exceeds the predetermined temperature threshold.

11. The engine power management system of claim 6, wherein the hydraulic temperature sensor is fixed to a hydraulic fluid tank containing hydraulic fluid, the hydraulic temperature sensor being at least partially submerged in the hydraulic fluid.

12. The engine power management system of claim 6, wherein the coolant temperature sensor is fixed to a coolant line carrying coolant fluid to the engine, the coolant temperature sensor being at least partially submerged in the coolant fluid.

13. A method of managing engine power of a work machine, the work machine including an engine, the method comprising:
monitoring a temperature of a hydraulic fluid of the work machine;
monitoring a temperature of a coolant fluid of the work machine;
limiting a torque of the engine when either the temperature of the hydraulic fluid or the temperature of the coolant fluid exceeds a first predetermined threshold;
removing the limit to the torque of the engine when the hydraulic fluid temperature and the coolant fluid temperature fall below a second predetermined threshold for a predetermined period of time.

14. The method of claim 13, further including displaying a warning to an operator of the work machine while the torque of the engine is limited.

15. The method of claim 13, wherein the temperature of the hydraulic fluid is monitored using a hydraulic temperature sensor at least partially submerged in the hydraulic fluid of the work machine.

16. The method of claim 13, wherein the temperature of the coolant fluid is monitored using a coolant temperature sensor at least partially submerged in the coolant fluid of the work machine.

* * * * *